(12) United States Patent
Ishihara

(10) Patent No.: US 9,417,429 B2
(45) Date of Patent: Aug. 16, 2016

(54) IMAGE PICK-UP APPARATUS

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/742,572

(22) Filed: Jun. 17, 2015

(65) Prior Publication Data

US 2015/0370037 A1 Dec. 24, 2015

(30) Foreign Application Priority Data

Jun. 20, 2014 (JP) ................................. 2014-127535

(51) Int. Cl.
*G02B 9/08* (2006.01)
*G02B 13/18* (2006.01)
(Continued)

(52) U.S. Cl.
CPC .. *G02B 9/60* (2013.01); *G02B 6/06* (2013.01); *G02B 13/06* (2013.01); *G02B 13/18* (2013.01); *G02B 27/0025* (2013.01); *H04N 5/3572* (2013.01); *G02B 5/005* (2013.01); *G02B 9/62* (2013.01); *G02B 13/0045* (2013.01); *G11B 7/1374* (2013.01)

(58) Field of Classification Search
CPC ...... G02B 13/0045; G02B 13/18; G02B 9/60; G02B 9/62; G02B 5/005; G11B 7/1374
USPC ................ 359/662–664, 719, 740, 796, 797; 369/112.23, 112.24, 112.26; 250/227.2
See application file for complete search history.

(56) References Cited

U.S. PATENT DOCUMENTS 9,104,018 B2 * 8/2015 Ishihara ................. G02B 13/18
2013/0076900 A1 * 3/2013 Mrozek ................. G02B 13/14
359/356

(Continued)

FOREIGN PATENT DOCUMENTS

JP 2005-338341 A 12/2005

*Primary Examiner* — Evelyn A Lester
(74) *Attorney, Agent, or Firm* — Canon USA Inc., IP Division

(57) ABSTRACT

An image pick-up apparatus includes an imaging optical system including a plurality of lenses and a diaphragm arranged between the lenses, the imaging optical system forming an image on an image surface; and an image sensor that detects the image formed on the image surface. The imaging optical system includes a front lens group on an object side with respect to the diaphragm, and a rear lens group on the image surface side with respect to the diaphragm. A lens surface having the highest power in the front lens group and a lens surface having the highest power in the rear lens group are concentric surfaces. The front lens group includes a plano-concave lens whose light-exiting-side surface has a concave surface and whose light-incident-side surface has power $\phi r$ that satisfies the following expression:

$$-0.05 \leq \frac{\phi r}{\phi o} \leq 0.05$$

where $\phi o$ is the power of the entire imaging optical system.

15 Claims, 4 Drawing Sheets

(51) Int. Cl.

| | | |
|---|---|---|
| G11B 7/135 | (2012.01) | |
| G02B 9/60 | (2006.01) | |
| G02B 6/06 | (2006.01) | |
| G02B 27/00 | (2006.01) | |
| H04N 5/357 | (2011.01) | |
| G02B 13/06 | (2006.01) | |
| G02B 13/00 | (2006.01) | |
| G02B 9/62 | (2006.01) | |
| G02B 5/00 | (2006.01) | |
| G11B 7/1374 | (2012.01) | |

(56) References Cited

U.S. PATENT DOCUMENTS

2014/0015997 A1    1/2014   Baba
2015/0116553 A1*   4/2015   Ford .......................... F24J 2/08
                                                                                                   359/754

\* cited by examiner ically, the lens surface 1 which is a concentric surface satisfies the following Exp. 1:

IMAGE PICK-UP APPARATUS

BACKGROUND OF THE INVENTION

1. Field of the Invention

The present disclosure relates to an image pick-up apparatus.

2. Description of the Related Art

An image pick-up apparatus using a curved imaging surface has been developed. Japanese Patent Laid-Open No. 2005-338341 (Patent Literature 1) discloses an image pick-up apparatus including a ball lens and an image-surface conversion element that is a bundle of optical fibers each having an opening end that faces a curved image surface of the ball lens. Patent Literature 1 also discloses a configuration in which all the optical fibers of the image-surface conversion element are aligned in the longitudinal direction, at the opening ends, with the direction of the center of the ball lens.

US Patent Application Publication No. 2014/0015997 (Patent Literature 2) discloses an image pick-up apparatus including an image sensor curved to be concave with respect to an object side.

With an image-surface conversion element as in Patent Literature 1, an increase in the angle of incidence of an off-axis beam incident on the ball lens relative to its optical axis increases the exit angle of the beam exiting from the image-surface conversion element relative to its optical axis. This causes the beam to enter an image sensor from an oblique direction out of a direction perpendicular to the image sensor. This decreases the photoreceptive sensitivity of the image sensor.

With a curved image sensor as in Patent Literature 2, an image sensor curved in the same shape as that of the imaging surface has a large amount of sag in the periphery of the image sensor, making it difficult to manufacture the image sensor. An image sensor curved to a radius of curvature larger than the radius of curvature of the imaging surface to reduce the amount of sag would disadvantageously decrease the photoreceptive sensitivity of the image sensor, described above.

SUMMARY OF THE INVENTION

An image pick-up apparatus according to an aspect of the present disclosure includes an imaging optical system including a plurality of lenses and a diaphragm arranged between the lenses; and an image sensor that detects the image formed on the image surface. The imaging optical system forms an image surface. The image surface is curved. The imaging optical system includes a front lens group including lenses disposed on an object side with respect to the diaphragm; and a rear lens group including lenses disposed on the image surface side with respect to the diaphragm. The imaging optical system includes a front lens group including lenses disposed on an object side with respect to the diaphragm; and a rear lens group including lenses disposed on the image surface side with respect to the diaphragm. A lens surface among lens surfaces in the front lens group has a highest power surface of the front lens group, and a lens surface among lens surfaces in the rear lens group has a highest power surface the rear lens group, the lens surface having the highest power surface of the front lens group and the lens surface having the highest power surface of the rear lens group are concentric surfaces. The front lens group includes a plano-concave lens whose light-exiting-side surface has a concave surface and whose light-incident-side surface has power $\phi r$ that satisfies a following expression:

$$-0.05 \le \frac{\phi r}{\phi o} \le 0.05$$

where $\phi o$ is the power of the entire imaging optical system.

Further aspects of the present invention will become apparent from the following description of exemplary embodiments with reference to the attached drawings.

DESCRIPTION OF THE EMBODIMENTS

Although the present disclosure will be described using embodiments and drawings, the embodiments are given for mere illustration and are not intended to limit the scope of the present disclosure.

In the following embodiments, for an imaging optical system including a diaphragm, a lens group disposed on an object side with respect to the diaphragm is referred to as a front lens group, and a lens group disposed on an imaging surface side with respect to the diaphragm is referred to as a rear lens group. The lens group may be either composed of a plurality of lenses or a single lens.

Figure 4:
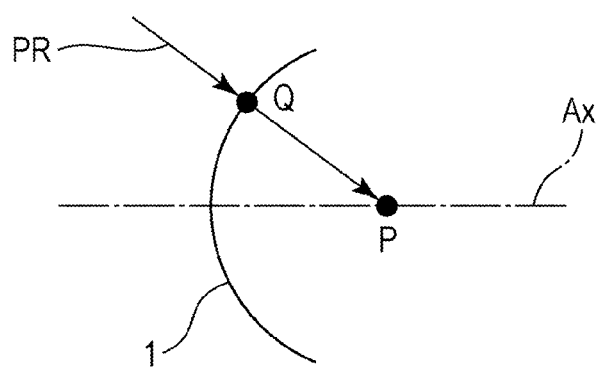
FIG. 4 is a diagram illustrating a concentric surface.

A concentric surface will be described with reference to FIG. 4. FIG. 4 shows the state of a principal ray PR of an off-axis beam incident on any point Q on a lens surface 1. The lens surface 1 is the interface of two media having different refractive indices and is a spherical surface or an aspherical surface. The off-axis beam is a beam that is not parallel to the optical axis AX of the imaging optical system. If the lens surface 1 is a concentric surface, the principal ray PR is little refracted by the lens surface 1 and exits toward the vicinity of the center of curvature P of the lens surface 1. More specifi- $$-0.2 \le \frac{R - Lp}{|Lp|} \le 0.2 \qquad \text{Exp. 1}$$

where R is the radius of curvature of the lens surface 1, Lp is the distance from the any point Q on the lens surface 1 to the intersection P of an extension of the principal ray PR of the off-axis beam incident on the point Q on the lens surface 1 and the optical axis AX of the imaging optical system. In other words, in FIG. 4, the distance Lp is the distance of vector QP defined by the principal ray PR. If the center of curvature or intersection P is on the object side (light incidence side) with respect to the lens surface 1, the radius of curvature R takes a negative value, and if the center of curvature P is on the imaging surface side (light exit side) with respect to the lens surface 1, the radius of curvature R takes a positive value. Likewise, if the intersection or center of curvature P is on the object side with respect to the lens surface 1, the distance Lp takes a negative value, and if the intersection is on the imaging surface side with respect to the lens surface 1, the distance Lp takes a positive value.

The characteristic of the concentric surface is as follows: for the front lens group, the principal rays PR of off-axis beams at different angles of view passing through the lens surface 1 travel to one point, and for the rear lens group, the principal rays PR of off-axis beams at different angles of view passing through the lens surface 1 are generated from one point.

The power φr of one lens surface 1 is expressed by the following Exp. 2:

$$\phi r = \frac{N' - N}{R} \quad \text{Exp. 2}$$

where N' is the refractive index of a medium on the light exiting side of the lens surface 1, N is the refractive index of a medium on the light incident side of the lens surface 1, and R is the radius of curvature of the lens surface 1. If the lens surface 1 is an aspherical surface, R is the radius of paraxial curvature of the lens surface 1.

In image sensors, the photoreceptive sensitivity decreases as the incidence angle light with respect to the normal (or a direction perpendicular) to the light receiving surface of the sensor increases. The photoreceptive sensitivity to light at an incidence angle of 35.0° is about one-half the photoreceptive sensitivity to light at an incidence angle of 0.0°, and the photoreceptive sensitivity to light at an incidence angle of 40.0° decreases to about 35% of the photoreceptive sensitivity to light at the incidence angle 0.0°. To light incident at an incidence angle larger than the incidence angle of 40.0°, the photoreceptive sensitivity of image sensors decreases sharply. Thus, the angle of light incident on image sensors is preferably 40.0° or less. More preferably, the incidence angle is 35.0° or less. Image pick-up apparatuses according to the following embodiments can change the incidence angle of a principal ray incident on the image sensor to 40.0° or less, even if the light is an off-axis beam having an angle larger than 40.0° with respect to the optical axis of the imaging optical system.

First Embodiment

Figure 1A:
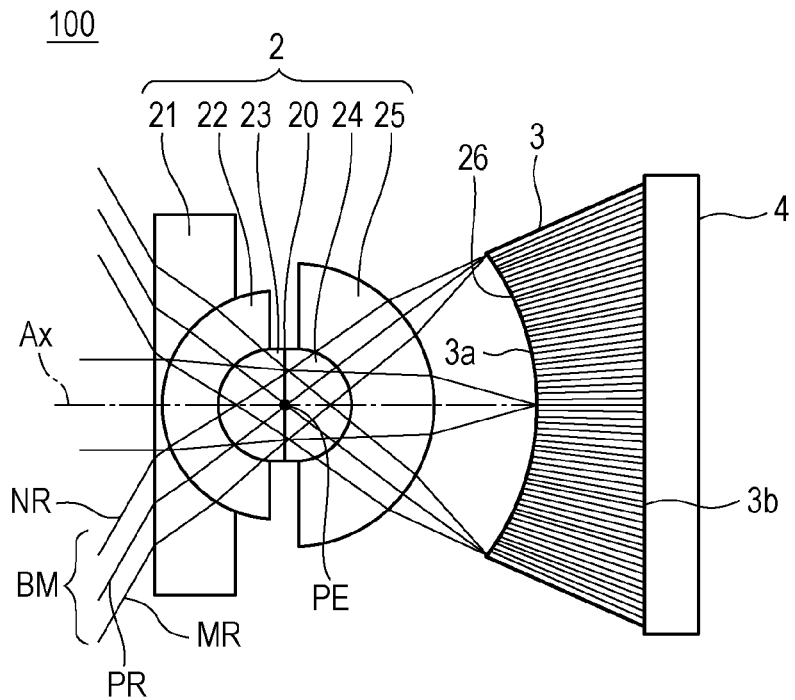
FIG. 1A is a schematic diagram of an example of an image pick-up apparatus according to a first embodiment.

FIG. 1A is a schematic diagram of an example of an image pick-up apparatus 100 according to a first embodiment. The image pick-up apparatus 100 of this embodiment includes an imaging optical system (imaging optics) 2, an optical fiber bundle 3 serving as an image-surface 26 conversion element, and an image sensor 4. The imaging optical system 2, the optical fiber bundle 3, and the image sensor 4 are disposed so as to transmit an image formed by the imaging optical system 2 to the image sensor 4 through the optical fiber bundle 3. The optical fiber bundle 3 includes a plurality of optical fibers that guide light coming from the imaging optical system 2 to the image sensor 4. The image surface 26 of the imaging optical system 2 is curved. Specifically, the image surface 26 is convex to the optical fiber bundle 3. Specifically, the individual optical fibers receive imaging light BM via the imaging optical system 2 and guide the imaging light BM to the individual pixels of the image sensor 4 through the optical fibers. The imaging light BM is light that can enter the optical fibers through an aperture of a diaphragm 20 and includes a principal ray PR passing through the center of the aperture of the diaphragm 20 and an upper marginal ray NR and a lower marginal ray MR which are defined by the aperture of the diaphragm 20.

A light incident surface 3a of the optical fiber bundle 3 is concave with respect to the imaging optical system 2. More specifically, the light incident surface 3a has a concave shape with a curvature approximately the same as that of the image surface 26 of the imaging optical system 2. The concave shape of surface 3a allows the optical fiber bundle 3 to receive light at high resolution without blurring an image on the image surface 26 of the imaging optical system 2. The light incident surface 3a has a smooth optical surface formed by spherical surface polishing processing as it is done for glass lenses. This polishing processing technique can prevent or at least reduce scattering of light on the light incident surface 3a. In contrast, a light exit surface 3b of the optical fiber bundle 3 is flat. The optical fiber bundle 3 is disposed so that the light exit surface 3b and the light incident surface of the image sensor 4 are in close contact with each other. The light exit surface 3b also has an optical surface formed by surface polishing like the light incident surface 3a, and is in close contact with the image sensor 4 so as to optimize the transfer of light.

Optical fibers of the optical fiber bundle 3 distant from the optical axis AX of the imaging optical system 2 are angled with respect to the optical axis AX. The angles of inclination are set so as to satisfy conditions for the imaging light BM entering the optical fibers to be totally reflected in the optical fibers. This configuration prevents loss of light transmission through the optical fibers in the periphery of the optical fiber bundle 3.

The imaging optical system 2 includes a first lens 21, a second lens 22, a third lens 23, a fourth lens 24, and a fifth lens 25 in order from the object side (in the order in which light travels from an object scene to the sensor). The imaging optical system 2 further includes the diaphragm 20. The diaphragm 20 is disposed between the third lens 23 and the fourth lens 24. In this embodiment, the lenses are joined together in the order mentioned above. Thus, for example, the light-exiting-side lens surface (exit surface) of the first lens 21 and the light-incident-side lens surface (input surface) of the second lens 22 are joined together to form a same lens surface. The light-incident-side lens surface (input surface) of the first lens 21 is referred to as a first lens surface, and a lens surface, which is the interface between first lens 21 and the second lens 22, is referred to as a second lens surface. A lens surface, which is the interface between the second lens 22 and the third lens 23, is referred to as a third lens surface. A lens surface, which is the interface between the fourth lens 24 and the fifth lens 25, is referred to as a fourth lens surface. A light-exiting-side lens surface of the fifth lens 25 is referred to as a fifth lens surface.

The first lens 21, the second lens 22, and the third lens 23 are arranged to form the front lens group. The first lens surface, the second lens surface, and the third lens surface are of the front lens group. The second lens surface is the highest power surface of the front lens group, whose power expressed by Exp. 2 is the highest of the front lens group. The power of the front lens group is positive. The fourth lens 24 and the fifth lens 25 are of the rear lens group. The fourth lens surface and the fifth lens surface are of the rear lens group. The fifth lens surface is the highest power surface of the rear lens group, whose power expressed by Exp. 2 is the highest of the rear lens group. The power of the rear lens group is also positive.

In this embodiment, at least the second lens surface and the fifth lens surface are concentric surfaces. That is, the second lens surface and the fifth lens surface satisfy Exp. 1. The third lens surface and the fourth lens surface may also be concentric surfaces. In other words, the third lens surface and the fourth lens surface may satisfy Exp. 1.

The intersection of an extension of the principal ray PR of an off-axis beam incident on one point on the second lens surface and the optical axis AX of the imaging optical system 2 and the intersection of an extension of the principal ray PR of an off-axis beam incident on one point on the fifth lens surface and the optical axis AX of the imaging optical system 2 may be at substantially the same position. The position may be at the center PE of the diaphragm 20. The intersection of an extension of the principal ray PR of an off-axis beam incident on one point on the third lens surface and the optical axis AX of the imaging optical system 2 and the intersection of an extension of the principal ray PR of an off-axis beam incident on one point on the fourth lens surface and the optical axis AX of the imaging optical system 2 are also at the center PE of the diaphragm 20. In other words, the lens surface of the concentric surfaces may satisfy the following Exp. 3:

$$-0.2 \leq \frac{R - La}{|La|} \leq 0.2 \qquad \text{Exp. 3}$$

where R is the radius of curvature of a concentric lens surface, and La is the distance from one point on the concentric lens surface to the center PE of the diaphragm 20. If the center of curvature is on the object side with respect to the lens surface, the radius of curvature R takes a negative value, and if the center of curvature is on the imaging surface side with respect to the lens surface, the radius of curvature R takes a positive value. Likewise, if the center PE of the diaphragm 20 is on the object side with respect to the lens surface, the distance La takes a negative value, and if the center PE of the diaphragm 20 is on the imaging surface side with respect to the lens surface, the distance La takes a positive value.

The first lens 21 is a plano-concave lens whose light-incident surface is a flat surface or a substantially flat surface formed of a concave surface having a very large radius of curvature and whose light exit surface is a concave surface. The light incident surface of the first lens 21, which is the first lens surface, is a non-power surface or a surface having negligible power. For example, when the light incident surface of the first lens 21 has a power of 1% or less compared to the power of the exit-side surface (second surface) of the lens 21, the power of light incident surface may be considered negligible. In this embodiment, the non-power surface includes a flat surface, a slightly concave surface, and a slightly convex surface having little converging power. The power $\phi r$ of the first lens surface satisfies the following Exp. 4:

$$-0.05 \leq \frac{\phi r}{\phi o} \leq 0.05 \qquad \text{Exp. 4}$$

where $\phi o$ is the power of the imaging optical system 2, which is expressed as the reciprocal of the focal length of the imaging optical system 2.

Figure 1B:
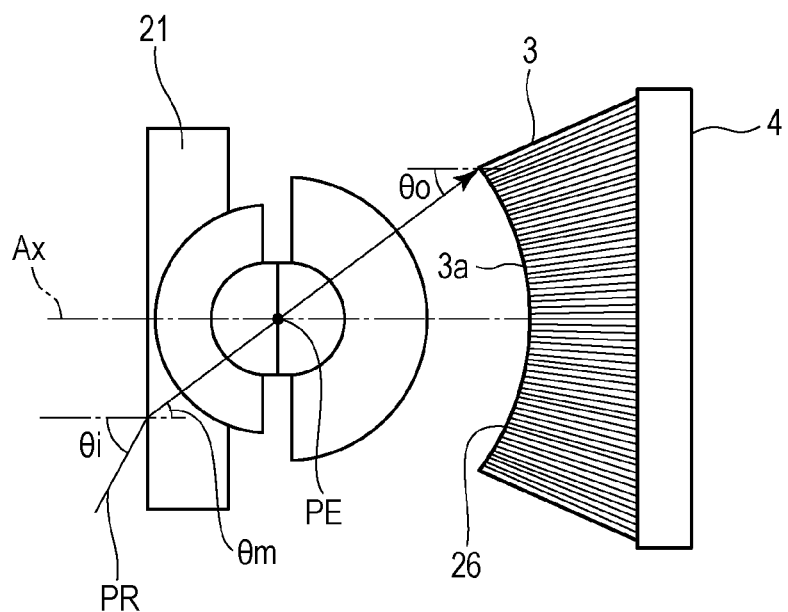
FIG. 1B is a diagram illustrating refraction of the principal ray of an off-axis beam on a first lens surface of a first lens.

In other words, in this embodiment, the first lens surface of the first lens 21 is a non-power surface, and the second lens surface is a surface concentric to a surface of the second lens group as further described below. By using the first lens surface, or the non-power surface, the angle of refraction of an incident on-axis (paraxial) beam is not changed in a direction parallel to the optical axis AX of the imaging optical system 2, with the beam kept parallel. FIG. 1B shows the refraction of the principal ray PR of an off-axis beam on the first lens surface of the first lens 21. The incidence angle $\theta i$ of the principal ray PR on the first lens surface and the exit angle $\theta m$ of the principal ray PR exiting from the first lens surface satisfy the following Exp. 5 based on Snell's law:

$$\sin \theta i = N \sin \theta m \qquad \text{Exp. 5}$$

where N is the refractive index of the first lens 21. The refractive index is 1 because there is air on the light incident side of the first lens 21.

Since the glass member, which is the medium of the first lens 21, has a refractive index higher than that of air (N>1), the first lens 21 allows a beam to exit at the exit angle $\theta m$ smaller than the incidence angle $\theta i$ due to its refracting effect, even though the first lens surface is a non-power surface. Since the second lens surface, which is the highest power surface of the front lens group, is a concentric surface, as described above, principal rays PR incident on any position on the second lens surface are not refracted and travel toward substantially the same point (the center PE of the diaphragm 20) on the optical axis AX. That is, the principal rays PR travel toward the center PE of the diaphragm 20, with the angle to the optical axis AX kept at the angle $\theta m$ of the refraction on the first lens surface. Since the fifth lens surface, which is the highest power surface of the rear lens group, is also a concentric surface, the principal rays PR passing through the center PE of the diaphragm 20 are hardly refracted and travel toward the light incident surface 3a of the optical fiber bundle 3 through the fifth lens surface. That is, the light incident surface 3a of the optical fiber bundle 3 receives the principal rays PR at the angle $\theta m$ to the optical axis AX. This makes the incidence angle to the optical fiber bundle 3 smaller than that to the first lens surface, enhancing the transmittance of the optical fibers, and furthermore, makes the angle of the principal rays PR of beams at different angles incident on the image sensor 4 smaller that without the first lens 21.

The first lens surface, which is a non-power surface, may be disposed in the front lens group because it may be disposed on the object side in the imaging optical system 2. Furthermore, the first lens surface may be disposed on the object side with respect to the highest power surface of the front lens group. The first lens surface may be disposed closest to the object in the imaging optical system 2. That is, the first lens 21 may be disposed closest to the object in the front lens group. Disposing the first lens surface, which is a non-power surface, closest to the object, allows the angle of a beam at any angle to be changed, with the convergence and aberration of the beam unchanged. This facilitates aberration correction using the following lenses.

The incidence angle $\theta o$ of the principal ray PR of an off-axis beam to the optical fiber bundle 3 does not always match the exit angle $\theta m$ to the first lens surface due to a manufacturing error during joining of the lenses of the imaging optical system 2. Even in that case, the angles of the principal rays PR of beams at different angles incident on the image sensor 4 can be made small, provided that the following Exp. 6 is satisfied:

$$-0.2 \leq \frac{N1\sin\theta o - \sin\theta i}{\sin\theta i} \leq 0.2 \qquad \text{Exp. 6}$$

where $\theta i$ is an incidence angle equal to or larger than 0.0 and less than 90.0° that an extension of the principal ray PR incident on the first lens surface and the optical axis AX form, and $\theta o$ is an angle equal to or larger than 0.0 and less than 90.0° that an extension of the principal ray PR exiting from the imaging optical system 2 and incident on the image surface 26 and the optical axis AX form. N1 is the refractive index of the first lens 21.

If the value of the central numerical expression in Exp. 6 is lower than the lower limit of Exp. 6, the effect of bringing the beam close to the optical axis AX of the imaging optical system 2 is obtained by an action other than the refraction on the non-power surface. This makes it difficult to correct spherical aberration and axial chromatic aberration using the following lens independently of other aberrations. In contrast, if the value of the central numerical expression is larger than the upper limit of Exp. 6, the incidence angle to the image sensor 4 increases. This decreases the effect of reducing a decrease in photoreceptive sensitivity.

For example, in a numerical example discussed below, the refractive index N of the first lens 21 is 1.48749. As a result, the incidence angle $\theta i$ of the principal ray PR, which is incident light on the imaging optical system 2, is 60.0°, and the exit angle $\theta o$ of the principal ray PR coming from the imaging optical system 2 is 35.3°. If the central numerical expression in Exp. 6 is calculated using the above values, the result is −0.008, which satisfies Exp. 6.

The Abbe number vd of the first lens 21 may satisfy the following Exp. 7:

$$50 \leq vd \leq 100. \qquad \text{Exp. 7}$$

If the Abbe number is smaller than the lower limit of Exp. 7, chromatic aberration of magnification due to refraction on the first lens surface, which is a non-power surface, increases. Glass members tend to decrease in refractive index as Abbe number increases, so that if the Abbe number exceeds the upper limit of Exp. 7, the refractive index of the first lens 21 becomes too small, and thus reduces the refracting effect of the first lens surface.

The second lens 22 is a meniscus lens whose light incident surface is convex and whose light exit surface is concave. The light incident surface is the second lens surface, and the light exit surface is the third lens surface. The centers of curvature of the second lens surface and the third lens surface are disposed in the vicinity of the center PE of the diaphragm 20. The second lens surface and the third lens surface may satisfy Exps. 1 and 3. The light exit surface of the second lens 22 is joined with the light incident surface of the third lens 23.

The third lens 23 is a plano-convex lens whose light incident surface is convex and whose light exit surface is flat. The third lens 23 has the diaphragm 20 on its light exit surface. Specifically, a light shielding portion of the diaphragm 20 is provided on the light exit surface of the light third lens 23 to limit the beam width. The light exit surface of the third lens 23 is joined with the light incident surface of the fourth lens 24.

The fourth lens 24 is a plano-convex lens whose light incident surface is flat and whose light exit surface is convex. The center of curvature of the fourth lens surface, which is a light exit surface, is disposed in the vicinity of the center PE of the diaphragm 20. The fourth lens surface may satisfy Exps. 1 and 3. The light exit surface of the fourth lens 24 is joined with the light incident surface of the fifth lens 25.

The fifth lens 25 is a meniscus lens whose light incident surface is concave and whose light exit surface is convex. The center of curvature of the fifth lens surface, which is a light exit surface, is disposed in the vicinity of the center PE of the diaphragm 20. The fifth lens surface may satisfy Exps. 1 and 3.

In this embodiment, the center of curvature of the light incident surface of the optical fiber bundle 3 is disposed in the vicinity of the center PE of the diaphragm 20. Specifically, the following Exp. 8 is satisfied:

$$-0.2 \leq \frac{Rimg - Lb}{|Lb|} \leq 0.2 \qquad \text{Exp. 8}$$

where Rimg is the radius of curvature of the incident surface of the optical fiber bundle 3 (imaging surface), and Lb is the distance from any one point on the imaging surface to the center PE of the diaphragm 20. If the center of curvature is on the object side with respect to the imaging surface, the radius of curvature Rimg takes a negative value, and if the center of curvature is on the opposite side from the object with respect to the imaging surface, the radius of curvature Rimg takes a positive value. Likewise, if the center PE of the diaphragm 20 is on the object side with respect to the imaging surface, the distance Lb takes a negative value, and if the center PE of the diaphragm 20 is on the opposite side from the object with respect to the imaging surface, the distance Lb takes a positive value.

If Exp. 8 is satisfied, an imaging surface along the curved imaging surface of the imaging optical system 2 can be provided, thus allowing a high-resolution, best-focus image without field curvature to be acquired.

The center of curvature of the imaging surface on the light incident surface of the optical fiber bundle 3 may satisfy the following Exp. 9:

$$-0.2 \leq \frac{Rimg - Lq}{|Lq|} \leq 0.2 \qquad \text{Exp. 9}$$

where Rimg is the radius of curvature of the imaging surface, and Lq is the distance from any one point on the imaging surface to the intersection of an extension of the principal ray PR of an off-axis beam incident on the one point on the imaging surface and the optical axis AX of the imaging optical system 2. If the center of curvature is on the object side with respect to the imaging surface, the radius of curvature Rimg takes a negative value, and if the center of curvature is on the opposite side from the object with respect to the imaging surface, the radius of curvature Rimg takes a positive value. Likewise, if the intersection is on the object side with respect to the imaging surface, the distance Lb takes a negative value, and if the intersection is on the opposite side from the object with respect to the imaging surface, the distance Lb takes a positive value.

In this embodiment, the first lens surface and the fifth lens surface are in contact with air. Of the lens surfaces in contact with air, the lens surface other than the first lens surface, which is a non-power surface, that is, the fifth lens surface, is a concentric surface, as described above. This allows the angle of a beam changed on the non-power surface to be kept, thereby decreasing the incidence angle to the image surface 26.

In this embodiment, the imaging optical system 2 includes no air space. Alternatively, the imaging optical system 2 of this embodiment may include a little air space. Let Dair be the total thickness of an air space between the intersection of a lens surface (first lens surface) closest to the object of the imaging optical system 2 and the optical axis AX of the imaging optical system 2 and the intersection of a lens surface (fifth lens surface) closest to the image surface 26 and the optical axis AX of the imaging optical system 2. Let Lo be the total length of the imaging optical system 2, that is, the distance between the intersection of a lens surface (first lens surface) closest to the object of the imaging optical system 2 and the optical axis AX of the imaging optical system 2 and the intersection of a lens surface (fifth lens surface) closest to the image surface 26 and the optical axis AX of the imaging optical system 2. The total thickness Dair and the total length Lo may satisfy the following Exp. 10:

$$0 \le \frac{Dair}{Lo} \le 0.2 \qquad \text{Exp. 10}$$

If Exp. 10 is not satisfied, the exit angle from a lens surface to the air space is small, thus making it difficult to decrease the incidence angle to the image surface 26. This also causes a problem in correcting aberration.

Numerical examples of this embodiment are shown in Tables 1 to 3.

TABLE 1

| LENS | D (mm) | REFRACTIVE INDEX | ABBE NUMBER vd |
|---|---|---|---|
| FIRST LENS | 0.10 | 1.48749 | 70.2 |
| SECOND LENS | 0.80 | 2.00270 | 19.3 |
| THIRD LENS | 0.96 | 1.90366 | 31.3 |
| DIAPHRAGM | 0.98 | — | — |
| FOURTH LENS | 1.20 | 1.88300 | 40.8 |
| FIFTH LENS | 1.46 | 2.00060 | 25.5 |

In Table 1, D is the thickness of a lens on the optical axis AX or the thickness of the member of the diaphragm 20 in a direction parallel to the optical axis AX.

TABLE 2

| | |
|---|---|
| FOCAL LENGTH f (mm) | 2.50 |
| POWER OF ENTIRE SYSTEM φo | 0.4000 |
| F-NUMBER F/# | 2.00 |
| FIELD ANGLE 2ω (deg) | 120.00 |
| POWER OF FRONT LENS GROUP φgr1 | 0.2112 |
| POWER OF REAR LENS GROUP φgr2 | 0.3824 |
| TOTAL THICKNESS OF AIR SPACE Dair (mm) | 0.0000 |
| ENTIRE LENGTH Lo (mm) | 5.5000 |
| Lair/Lo | 0.0000 | the lens surface and the optical axis AX to the intersection of an extension of the principal ray PR of the off-axis beam and the optical axis AX; and Lq is the distance from the intersection of the imaging surface and the optical axis AX to the intersection of an extension of the principal ray PR of the off-axis beam and the optical axis AX.

In Table 3, A is the value of the central numerical expression in Exp. 3 or the value of the central numerical expression in Exp. 8; and B is the value of the central numerical expression in Exp. 1 or the value of the central numerical expression in Exp. 9. The incidence angle is an angle equal to or larger than 0.0 and less than 90.0° that an extension of the principal ray PR of an off-axis beam incident on the lens surface, the interface between the lenses in which the diaphragm 20 if formed, or the imaging surface makes with the optical axis AX.

As shown in Table 3, in this numerical example, the second lens surface, the third lens surface, the fourth lens surface, and the fifth lens surface satisfy Exp. 1 and thus are concentric surfaces. This is because the first lens surface is disposed so that beams exiting from the first lens surface at different angles travel toward the diaphragm 20, and that the following lens surfaces are disposed so as to be substantially symmetrical about the center PE of the diaphragm 20.

The concentric surface has low refracting power for the principal rays PR of beams at different angles because they are incident on the lens surface substantially perpendicularly and thus acts little. For marginal light, the concentric surface has refracting power because they are incident on the lens surface at angles, thus offering a converging effect and the effect of correcting spherical aberration and axial chromatic aberration.

As shown in Table 3, the second lens surface, the third lens surface, the fourth lens surface, the fifth lens surface, and the imaging surface satisfy Exp. 3 or Exp. 8 and thus have similar shapes for beams at different angles. This allows the spherical aberration and the axial chromatic aberration of beams at different angles to be corrected by correcting the spherical aberration and the axial chromatic aberration on the optical axis AX.

In the image pick-up apparatus 100, no field curvature aberration occurs because the light incident surface (imaging surface) of the optical fiber bundle 3 is located along the shape of the image surface 26 of the imaging optical system 2. If the

TABLE 3

| LENS SURFACE | RADIUS OF CURVATURE | POWER φr | φr/φo | La or Lb (mm) | A | Lp or Lq (mm) | B | INCIDENCE ANGLE |
|---|---|---|---|---|---|---|---|---|
| FIRST SURFACE | −1123.7917 | −0.0004 | −0.0011 | 1.8600 | −605.189 | 0.7843 | −1433.885 | 60.000 |
| SECOND SURFACE | 1.6135 | 0.3193 | 0.7983 | 1.7600 | −0.083 | 1.8031 | −0.105 | 35.536 |
| THIRD SURFACE | 0.7983 | −0.1241 | −0.3102 | 0.9600 | −0.168 | 0.9505 | −0.160 | 36.554 |
| DIAPHRAGM | — | — | — | — | — | — | — | 36.202 |
| FOURTH SURFACE | −0.7915 | −0.1486 | −0.3715 | −0.9800 | 0.192 | −0.9800 | 0.192 | 36.686 |
| FIFTH SURFACE | −2.0547 | 0.9736 | 2.4341 | −2.1800 | 0.057 | −2.1667 | 0.052 | 37.180 |
| IMAGE SURFACE | −3.5870 | — | — | −3.6400 | 0.015 | −2.6529 | −0.352 | 35.279 |

In Table 3, La is the distance from the intersection of the lens surface and the optical axis AX to the center PE of the diaphragm 20; Lb is the distance from the intersection of the imaging surface and the optical axis AX to the center PE of the diaphragm 20; Lp is the distance from the intersection of imaging optical system 2 has a substantially point symmetrical configuration, coma aberration, astigmatism, distortion, and chromatic aberration of magnification do no occur. Since the remaining aberrations, that is, spherical aberration and axial chromatic aberration, can be corrected using the second lens surface, the third lens surface, the fourth lens surface, and the fifth lens surface, an image pick-up apparatus capable of high-resolution imaging can be provided.

In particular, the second lens surface, which is the highest power surface of the front lens group, and the fifth lens surface, which is the highest power surface of the rear lens group, are concentric surfaces. This enhances the effect of the configuration in which spherical aberration and axial chromatic aberration are well corrected and coma aberration, astigmatism, distortion, and chromatic aberration of magnification do not occur.

This provides very high imaging performance on an imaging surface. The very high imaging performance offers an optical system having a smaller focal ratio (F-number). In this embodiment, an optical system having a focal ratio F/2.0 can be provided using this effect.

As shown in Table 2, the power of the front lens group is $\phi gr1=0.2112$, which is positive. The positive power of the front lens group has the effect of converging light from a position distant from the imaging surface to thereby enhance the imaging performance. This also has an effect in reducing the size of the entire system.

The refractive index N1 of the first lens 21 is 1.48749, while the refractive index N2 of the second lens 22 is 2.00270. That is, N1<N2 holds. This configuration allows the power of the second lens surface, which is the interface between the light exit surface of the first lens 21 and the light incident surface of the second lens 22, to be positive, thus offering the above effect using the positive power of the front lens group.

Thus, in the image pick-up apparatus 100 of this embodiment, a plano-concave lens whose light incident surface is a flat or substantially flat non-power surface and whose light exit surface is a concave surface is disposed in the front lens group, and the highest power surface of the front lens group and the highest power surface of the rear lens group are concentric surfaces centered at a point PE on the optical axis AX where the diaphragm 20 is arranged.

With this simple configuration, the angle of an off-axis beam incident on an imaging surface relative to the optical axis AX can be smaller than the angle of incidence on the imaging optical system 2. This can reduce a decrease in the photoreceptive sensitivity of the image sensor 4 to a beam at a wide angle of view. This allows a wide-angle image pick-up apparatus to capture a high-quality image in which falling of light intensity in the periphery of the image sensor 4 is reduced. That is, the image pick-up apparatus 100 of this embodiment can reduce a decrease in photoreceptive sensitivity with a simple configuration even if the incidence angle of an off-axis beam incident on the imaging optical system 5 is increased.

Second Embodiment

Figure 2:
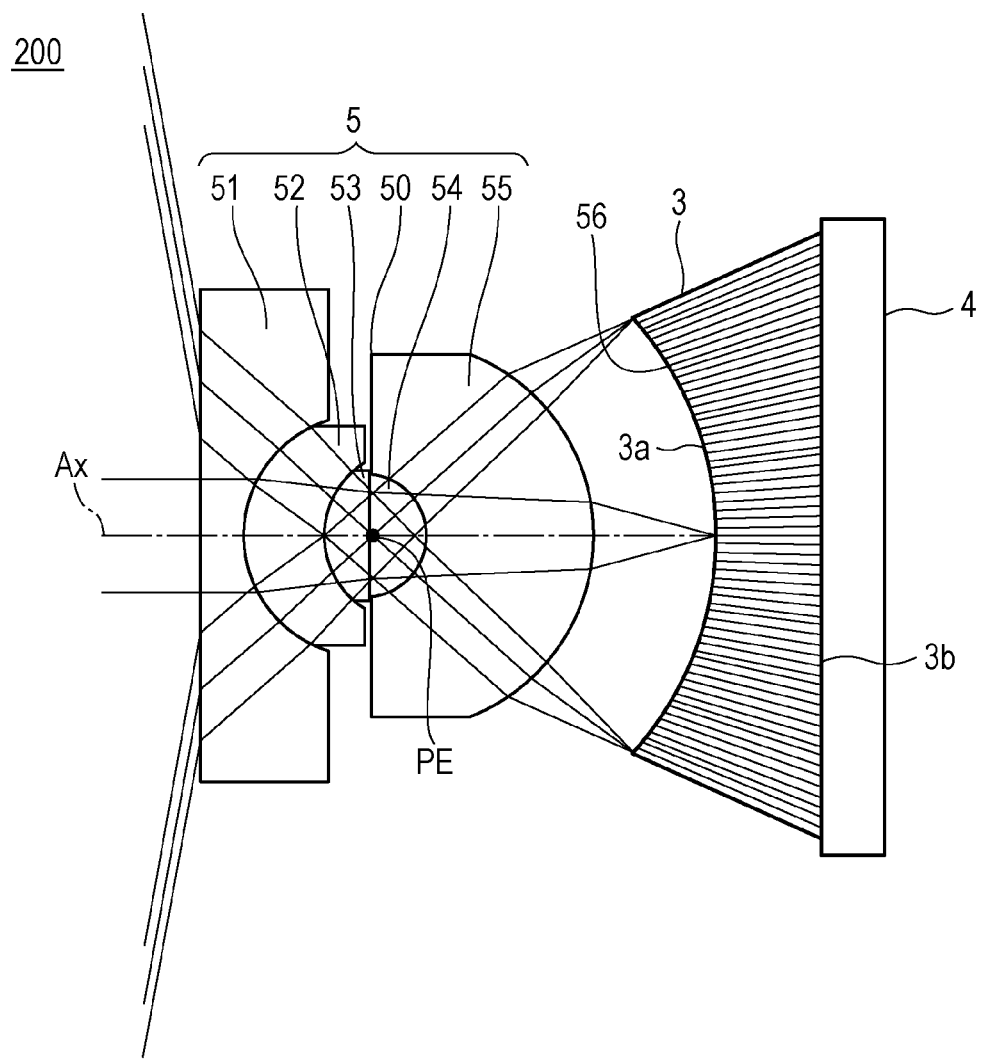
FIG. 2 is a schematic diagram of an example of an image pick-up apparatus according to a second embodiment.

An image pick-up apparatus 200 according to a second embodiment will be described with reference to FIG. 2. The difference between this embodiment and the first embodiment is that the configuration of the imaging optical system is changed to a wide-angle imaging optical system. The image pick-up apparatus 200 includes an imaging optical system 5, an optical fiber bundle 3, and an image sensor 4. The image pick-up apparatus 200 captures an image of a subject by forming an image of the subject on a curved light incident surface 3a of the optical fiber bundle 3 with the imaging optical system 5, transmitting the image from the light incident surface 3a of the optical fiber bundle 3 to a light exit surface 3b, and receiving the transmitted image with the image sensor 4.

The imaging optical system 5 includes, from an object side, a first lens 51, a second lens 52, a third lens 53, a fourth lens 54, a fifth lens 55, and a diaphragm 50 between the third lens 53 and the fourth lens 54. That is, a lens group including the first lens 51, the second lens 52, and the third lens 53 is a front lens group; and a lens group including the fourth lens 54 and the fifth lens 55 is a rear lens group.

The lenses are joined together. Thus, the interface between the first lens 51 and the second lens 52 is a second lens surface; the interface between the second lens 52 and the third lens 53 is a third lens surface; and the interface between the fourth lens 54 and the fifth lens 55 is a fourth lens surface. A light-incident-side lens surface of the first lens 51 is a first lens surface, and a light-exiting-side lens surface of the fifth lens 55 is a fifth lens surface.

Next, numerical examples of this embodiment will be shown in Tables 4 to 6.

TABLE 4

| LENS | D (mm) | REFRACTIVE INDEX | ABBE NUMBER vd |
|---|---|---|---|
| FIRST LENS | 0.50 | 1.51633 | 64.1 |
| SECOND LENS | 0.91 | 2.00270 | 19.3 |
| THIRD LENS | 0.50 | 1.85026 | 32.3 |
| DIAPHRAGM | 0.65 | — | — |
| FOURTH LENS | 1.86 | 1.91082 | 35.3 |
| FIFTH LENS | 1.36 | 2.00270 | 19.3 |

In Table 4, D is the thickness of a lens on the optical axis AX or the thickness of the member of the diaphragm 50 in a direction parallel to the optical axis AX.

TABLE 5

| | |
|---|---|
| FOCAL LENGTH f (mm) | 2.50 |
| POWER OF ENTIRE SYSTEM φo | 0.4000 |
| F-NUMBER F/# | 2.00 |
| FIELD ANGLE 2ω (deg) | 160.00 |
| POWER OF FRONT LENS GROUP φgr1 | 0.2398 |
| POWER OF REAR LENS GROUP φgr2 | 0.3896 |
| TOTAL THICKNESS OF AIR SPACE Dair (mm) | 0.0000 |
| ENTIRE LENGTH Lo (mm) | 5.7800 |
| Lair/Lo | 0.0000 |

TABLE 6

| LENS SURFACE | RADIUS OF CURVATURE | POWER φr | φr/φo | La or Lb (mm) | A | Lp or Lq (mm) | B | INCIDENCE ANGLE |
|---|---|---|---|---|---|---|---|---|
| FIRST SURFACE | 207.8185 | 0.0025 | 0.0062 | 1.9100 | 107.805 | 0.3077 | 674.497 | 80.000 |
| SECOND SURFACE | 1.3013 | 0.3738 | 0.9344 | 1.4100 | −0.077 | 1.4782 | −0.120 | 40.860 |
| THIRD SURFACE | 0.9152 | −0.1666 | −0.4164 | 0.5000 | 0.830 | 0.5216 | 0.755 | 42.113 |

TABLE 6-continued

| LENS SURFACE | RADIUS OF CURVATURE | POWER φr | φr/φo | La or Lb (mm) | A | Lp or Lq (mm) | B | INCIDENCE ANGLE |
|---|---|---|---|---|---|---|---|---|
| DIAPHRAGM | — | — | — | — | — | — | — | 43.573 |
| FOURTH SURFACE | −0.6434 | −0.1428 | −0.3570 | −0.6500 | 0.010 | −0.6500 | 0.010 | 41.874 |
| FIFTH SURFACE | −2.1352 | 0.9380 | 2.3449 | −2.5100 | 0.149 | −2.5097 | 0.149 | 41.893 |
| IMAGE SURFACE | −3.5965 | — | — | −3.8700 | 0.071 | −3.3393 | −0.077 | 35.000 |

In Table 6, La is the distance from the intersection of the lens surface and the optical axis AX to the center PE of the diaphragm 50; Lb is the distance from the intersection of the imaging surface and the optical axis AX to the center PE of the diaphragm 50; Lp is the distance from the intersection of the lens surface and the optical axis AX to the intersection of an extension of the principal ray PR of the off-axis beam and the optical axis AX; and Lq is the distance from the intersection of the imaging surface and the optical axis AX to the intersection of an extension of the principal ray PR of the off-axis beam and the optical axis AX.

In Table 6, A is the value of the central numerical expression in Exp. 3 or the value of the central numerical expression in Exp. 8; and B is the value of the central numerical expression in Exp. 1 or the value of the central numerical expression in Exp. 9. The incidence angle is an angle equal to or larger than 0.0 and less than 90.0° that an extension of the principal ray PR of an off-axis beam incident on the lens surface, the interface between the lenses in which the diaphragm 50 if formed, or the imaging surface makes with the optical axis AX.

The light-incident-side first lens surface of the first lens 51 is a convex surface having a very large radius of curvature, and the light-exiting-side second lens surface of the first lens 51 is a concave surface. The first lens surface is a non-power surface that satisfies Exp. 4. That is, the first lens 51 is a plano-concave lens.

The second lens surface is the highest power surface of the front lens group. The second lens surface is a concentric surface that satisfies Exp. 1. The center of curvature of the second lens surface is located in the vicinity of the center PE of the diaphragm 50, and the second lens surface satisfies Exp. 3.

The third lens surface does not satisfy Exp. 1 and is not a concentric surface. The center of curvature of the third lens surface is off the center PE of the diaphragm 50 or the vicinity thereof and dues not satisfy Exp. 3.

The fourth lens surface is a concentric surface that satisfies Exp. 1. The center of curvature of the fourth lens surface is located in the vicinity of the center PE of the diaphragm 50. The fourth lens surface satisfies Exp. 3.

The fifth lens surface is the highest power surface of the rear lens group. The fifth lens surface is a concentric surface that satisfies Exp. 1. The center of curvature of the fifth lens surface is located in the vicinity of the center PE of the diaphragm 50, and the fifth lens surface satisfies Exp. 3.

The center of curvature of the imaging surface is located in the vicinity of the center PE of the diaphragm 50, and the imaging surface satisfies Exp. 8.

The Abbe number of the first lens 51 satisfies Exp. 7. Both the power of the front lens group and the power of the rear lens group are positive. Since the lenses are joined together, there is no air space between the lenses, and Exp. 10 is satisfied.

In this embodiment, an angle θi that the principal ray of an off-axis beam incident on the imaging optical system 5 forms with the optical axis AX of the imaging optical system 5 is 80.0°, and an angle θo that the principal ray incident on the imaging surface forms with the optical axis AX of the imaging optical system 5 is 35.0°. Thus, the imaging optical system 5 satisfies Exp. 6. This offers the effect of reducing an incidence angle on the image surface 56 due to the refracting effect of the non-power surface, thus providing an image pick-up apparatus capable of correcting aberration with high accuracy. This also reduces a decrease in the photoreceptive sensitivity of the image sensor 4 for wide-angle beams, thus allowing wide-angle beams to be captured at sufficient intensity. That is, the image pick-up apparatus 200 of this embodiment can reduce a decrease in photoreceptive sensitivity with a simple configuration even if the incidence angle of an off-axis beam incident on the imaging optical system 5 is increased.

Third Embodiment

Figure 3:
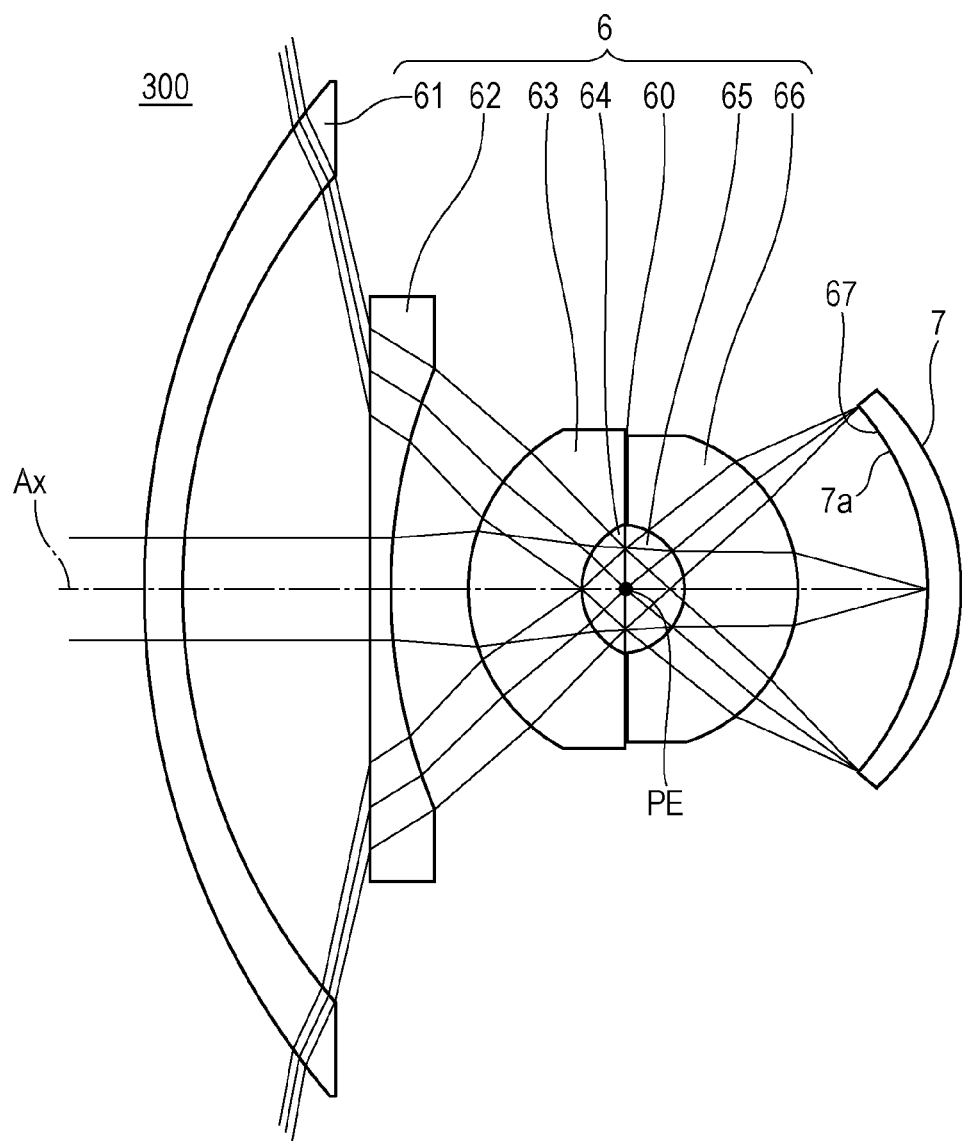
FIG. 3 is a schematic diagram of an example of an image pick-up apparatus according to a third embodiment.

An image pick-up apparatus 300 according to a third embodiment will be described with reference to FIG. 3. The difference between this embodiment and the first embodiment is that the configuration of the imaging optical system is changed and an image sensor having a curved imaging surface is used. The image pick-up apparatus 300 includes an imaging optical system 6 and an image sensor 7 and no optical fiber bundle as in the first embodiment.

The imaging optical system 6 forms an image surface 67. The image surface 67 is curved. The image pick-up apparatus 300 captures an image on the image surface 67 of the imaging optical system 6 with high resolution using the image sensor 7 whose imaging surface 7a is curved along the shape of the image surface 67 of the imaging optical system 6.

The image pick-up apparatus 300 includes, from the object side, a first lens 61, a second lens 62, a third lens 63, a fourth lens 64, a fifth lens 65, and a sixth lens 66. The image pick-up apparatus 300 further includes a diaphragm 60 between the fourth lens 64 and the fifth lens 65. That is, a lens group including the first lens 61, the second lens 62, the third lens 63, and the fourth lens 64 is a front lens group; and a lens group including the fifth lens 65 and the sixth lens 66 is a rear lens group. Air spaces are provided between the first lens 62 and the second lens 62 and between the second lens 62 and the third lens 63, respectively. The third lens 63 and the fourth lens 64, the fourth lens 64 and the fifth lens 65, and the fifth lens 65 and the sixth lens 66 are joined together.

Next, numerical examples of this embodiment will be shown in Tables 7 to 9.

TABLE 7

| LENS | D (mm) | REFRACTIVE INDEX | ABBE NUMBER νd |
|---|---|---|---|
| FIRST LENS | 1.00 | 1.48749 | 70.2 |
| AIR SPACE | 5.00 | 1.00000 | — |
| SECOND LENS | 0.50 | 1.75500 | 52.3 |
| AIR SPACE | 2.00 | 1.00000 | — |
| THIRD LENS | 3.00 | 2.00270 | 19.3 |
| FOURTH LENS | 1.12 | 1.80810 | 22.8 |
| DIAPHRAGM | 1.60 | — | — |
| FIFTH LENS | 3.00 | 1.88300 | 40.8 |
| SIXTH LENS | 3.40 | 2.00270 | 19.3 |

In Table 7, D is the thickness of a lens on the optical axis AX, the thickness of the diaphragm 60 in a direction parallel to the optical axis AX, or the thickness of an air space between lens surfaces along the optical axis AX.

TABLE 8

| | |
|---|---|
| FOCAL LENGTH f (mm) | 5.00 |
| POWER OF ENTIRE SYSTEM φo | 0.2000 |
| F-NUMBER F/# | 2.00 |
| FIELD ANGLE 2ω (deg) | 160.00 |
| POWER OF FRONT LENS GROUP φgr1 | 0.2398 |
| POWER OF REAR LENS GROUP φgr2 | 0.3896 |
| TOTAL THICKNESS OF AIR SPACE Dair (mm) | 7.0000 |
| ENTIRE LENGTH Lo (mm) | 20.6200 |
| Lair/Lo | 0.3395 |

TABLE 9

| LENS SURFACE | RADIUS OF CURVATURE | POWER φr | φr/φo | La or Lb (mm) | A | Lp or Lq (mm) | B | INCIDENCE ANGLE |
|---|---|---|---|---|---|---|---|---|
| FIRST SURFACE | 20.0000 | 0.0244 | 0.1219 | 12.6200 | 0.585 | 6.2259 | 2.212 | 80.000 |
| SECOND SURFACE | 16.2565 | −0.0300 | −0.1499 | 11.6200 | 0.399 | 8.8952 | 0.828 | 64.400 |
| THIRD SURFACE | −187.9466 | −0.0040 | −0.0201 | 6.6200 | −29.391 | 1.1437 | −165.337 | 77.733 |
| FOURTH SURFACE | 13.7272 | −0.0550 | −0.2750 | 6.1200 | 1.243 | 8.3548 | 0.643 | 32.297 |
| FIFTH SURFACE | 4.5292 | 0.2214 | 1.1069 | 4.1200 | 0.099 | 3.8315 | 0.182 | 43.520 |
| SIXTH SURFACE | 1.6641 | −0.1169 | −0.5847 | 1.1200 | 0.486 | 1.1609 | 0.433 | 40.456 |
| DIAPHRAGM | — | — | — | — | — | — | — | 41.704 |
| SEVENTH SURFACE | −1.5654 | −0.0765 | −0.3823 | −1.6000 | 0.022 | −1.6000 | 0.022 | 39.761 |
| EIGHTH SURFACE | −4.0735 | 0.2462 | 1.2308 | −4.6000 | 0.114 | −4.5978 | 0.114 | 39.811 |
| IMAGE SURFACE | −6.9360 | — | — | −8.0000 | 0.133 | −6.6170 | −0.048 | 35.000 |

In Table 9, La is the distance from the intersection of the lens surface and the optical axis AX to the center PE of the diaphragm 60; Lb is the distance from the intersection of the imaging surface and the optical axis AX to the center PE of the diaphragm 60; Lp is the distance from the intersection of the lens surface and the optical axis AX to the intersection of an extension of the principal ray PR of the off-axis beam and the optical axis AX; and Lq is the distance from the intersection of the imaging surface and the optical axis AX to the intersection of an extension of the principal ray PR of the off-axis beam and the optical axis AX.

In Table 9, A is the value of the central numerical expression in Exp. 3 or the value of the central numerical expression in Exp. 8; and B is the value of the central numerical expression in Exp. 1 or the value of the central numerical expression in Exp. 9. The incidence angle is an angle equal to or larger than 0.0 and less than 90.0° that an extension of the principal ray PR of an off-axis beam incident on the lens surface, the interface between the lenses in which the diaphragm 50 if formed, or the imaging surface makes with the optical axis AX.

The first lens 61 serves as a hood for protecting the following lenses, such as the second lens 62 following the first lens 61, and the image sensor 7. The light incident surface of the first lens 61 is a first lens surface, and the light exit surface of the first lens 61 is a second lens surface. The first lens surface does not satisfy Exp. 4. Therefore, the first lens 61 is not a plano-concave lens.

The light incident surface of the second lens 62 is a substantially flat third lens surface, and the light exit surface of the second lens 62 is a concave fourth lens surface. Since the third lens surface is a non-power surface that satisfies Exp. 4, the second lens 62 is a plano-concave lens.

The light incident surface of the third lens 63 is a fifth lens surface and is the highest power surface of the front lens group. The fifth lens surface is a concentric surface that satisfies Exp. 1. This allows generation of coma aberration, astigmatism, distortion, chromatic aberration of magnification to be reduced. The fifth lens surface satisfies Exp. 3. In other words, the center of curvature of the fifth lens surface is disposed in the vicinity of the center PE of the diaphragm 60. This allows spherical aberration and axial chromatic aberration to be well corrected even with a wide-angle imaging optical system. The fifth lens surface particularly corrects spherical aberration.

The sum of the power φpi of the fifth lens surface and the power φlo of the fourth lens surface is positive. That is, φpi+φlo>0 holds. Since the sum of the power of the fourth lens surface and the power of the fifth lens surface is positive, the front lens group can easily have positive power even if the fourth lens surface, which is the light exit surface of the plano-concave lens, and the fifth lens surface, which is the highest power surface of the front lens group, are separate lens surfaces. The positive power of the front lens group has the effect of converging light from a position distant from the imaging surface, thus enhancing the imaging performance. This also has an effect in reducing the size of the entire system.

The light exit surface of the third lens 63 is joined with the light incident surface of the fourth lens 64 and is referred to as a sixth lens surface.

The light exit surface of the fourth lens 64 is flat, at which a light shielding portion is provided to form the diaphragm 60. The fourth lens 64 and the fifth lens 65 are joined together in a region of the light exit surface of the fourth lens 64 in which the diaphragm 60 is not formed.

The light exit surface of the fifth lens 65 is a convex surface, which is a seventh lens surface joined with the light incident surface of the sixth lens 66. The seventh lens surface is a concentric surface that satisfies Exp. 1. The center of curvature of the seventh lens surface is located in the vicinity of the center PE of the diaphragm 60, and the seventh lens surface satisfies Exp. 3.

The light exit surface of the sixth lens 66 is an eighth lens surface and is the highest power surface of the rear lens group. The eighth lens surface is a concentric surface that satisfies Exp. 1. This allows generation of coma aberration, astigmatism, distortion, and chromatic aberration of magnification to be reduced. The eighth lens surface also satisfies Exp. 3. In other words, the center of curvature of the eighth lens surface is disposed in the vicinity of the center PE of the diaphragm 60. This allows spherical aberration and axial chromatic aberration to be well corrected even with a wider-angle imaging optical system. The eighth lens surface particularly corrects axial chromatic aberration in contrast to the fifth lens surface.

In this embodiment, an angle θi that the principal ray of an off-axis beam incident on the imaging optical system 5 forms with the optical axis θX of the imaging optical system 5 is 80.0°, and an angle θo that the principal ray incident on the imaging surface forms with the optical axis AX of the imaging optical system 5 is 35.0°. Thus, the imaging optical system 5 satisfies Exp. 6. This offers the effect of reducing an incidence angle on the image surface 67 due to the refracting effect of the non-power surface, thus providing an image pick-up apparatus capable of correcting aberration with high accuracy. This also reduces a decrease in the photoreceptive sensitivity of the image sensor 4 for wide-angle beams, thus allowing wide-angle beams to be captured at sufficient intensity. Thus, the image pick-up apparatus 300 of this embodiment can reduce a decrease in photoreceptive sensitivity with a simple configuration even if the incidence angle of an off-axis beam incident on the imaging optical system 5 is increased.

This embodiment includes the image sensor 7 having the curved imaging surface 7a. As shown in Table 9, the radius of curvature Rimg of the imaging surface 7a is −6.9360 mm. The distance La from any one point on the imaging surface 7a to the center PE of the diaphragm 60 is 8.00 mm, which satisfies Exp. 8. The curve of the imaging surface 7a of the image sensor 7 significantly decreases the incident angle of an off-axis beam to the image sensor 7.

In this embodiment, the image sensor 7 can be small in thickness by decreasing the exit angle of an off-axis beam incident on the imaging optical system as compared with its incidence angle using a plano-concave lens. This can reduce the sag (displacement from a flat surface) in the periphery of the curved imaging surface 7a. This provides an advantage in facilitating manufacture of the curved imaging surface.

The present disclosure provides an image pick-up apparatus particularly for digital still cameras, digital video cameras, mobile phone cameras, surveillance cameras, wearable cameras, and medical cameras.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-127535, filed June 20, 2014, which is hereby incorporated by reference herein in its entirety.

What is claimed is:

1. An image pick-up apparatus comprising:
   an imaging optical system including a plurality of lenses and a diaphragm arranged between the lenses, the imaging optical system forming an image on an image surface, the image surface being curved; and
   an image sensor that detects the image formed on the image surface,
   wherein the imaging optical system includes a front lens group including lenses disposed on an object side with respect to the diaphragm; and a rear lens group including lenses disposed on the image surface side with respect to the diaphragm;
   wherein a lens surface among lens surfaces in the front lens group has a highest power surface of the front lens group, and a lens surface among lens surfaces in the rear lens group has a highest power surface of the rear lens group, the lens surface having the highest power surface of the front lens group and the lens surface having the highest power surface of the rear lens group are concentric surfaces; and
   wherein the front lens group includes a plano-concave lens whose light-exiting-side surface has a concave surface and whose light-incident-side surface has power φr that satisfies a following expression:

$$-0.05 \le \frac{\phi r}{\phi o} \le 0.05$$

where φo is power of the entire imaging optical system.

2. The image pick-up apparatus according to claim 1, wherein the concentric lens surfaces satisfy a following expression:

$$-0.2 \le \frac{R - Lp}{|Lp|} \le 0.2$$

where R is a radius of curvature of the concentric lens surface, and Lp is a distance from one point on the lens surface to an intersection of an extension of a principal ray of an off-axis beam incident on the one point on the lens surface and an optical axis of the imaging optical system.

3. The image pick-up apparatus according to claim 1, wherein the plano-concave lens is disposed on the object side with respect to a lens having the highest power surface of the front lens group.

4. The image pick-up apparatus according to claim 3, wherein a following expression is satisfied:

N1<N2 where N1 is a refractive index of the plano-concave lens, and N2 is a refractive index of the lens having the highest power surface of the front lens group.

5. The image pick-up apparatus according to claim 1, wherein the plano-concave lens has Abbe number vd that satisfies a following expression:

50≤vd≤100.

6. The image pick-up apparatus according to claim 1, wherein the light-exiting-side lens surface of the plano-concave lens is a concentric surface.

7. The image pick-up apparatus according to claim 1, wherein all lens surfaces in contact with air in the imaging optical system are concentric surfaces.

8. The image pick-up apparatus according to claim 1, wherein the concentric lens surface satisfies a following expression:

$$-0.2 \leq \frac{R - La}{|La|} \leq 0.2$$

where R is a radius of curvature of the concentric lens surface, and La is a distance from one point on the concentric lens surface to a center of the diaphragm.

9. The image pick-up apparatus according to claim 1, wherein a curved imaging surface that receives light from the imaging optical system satisfies a following expression:

$$-0.2 \leq \frac{Rimg - Lb}{|Lb|} \leq 0.2$$

where Rimg is a radius of curvature of the imaging surface, and Lb is a distance from one point on the imaging surface to a center of the diaphragm.

10. The image pick-up apparatus according to claim 1, wherein a following expression is satisfied:

$$0 \leq \frac{Dair}{Lo} \leq 0.2$$

where Lo is a distance between an intersection of a lens surface closest to the object of the imaging optical system and an optical axis of the imaging optical system and an intersection of a lens surface closest to the image surface and the optical axis of the imaging optical system, and Dair is a total thickness of air space between the intersection of the lens surface closest to the object of the imaging optical system and the optical axis of the imaging optical system and the intersection of the lens surface closest to the image surface and the optical axis of the imaging optical system.

11. The image pick-up apparatus according to claim 1, comprising a curved imaging surface that receives light from the imaging optical system;

wherein a following expression is satisfied:

$$-0.2 \leq \frac{N1\sin\theta o - \sin\theta i}{\sin\theta i} \leq 0.2$$

where $\theta i$ is an angle that a principal ray of an off-axis beam incident on a lens surface closest to the object of the imaging optical system makes with an optical axis of the imaging optical system, $\theta o$ is an angle that the principal ray of the off-axis beam exiting from the imaging optical system and incident on the imaging surface makes with the optical axis of the imaging optical system, and N1 is a refractive index of the plano-concave lens.

12. The image pick-up apparatus according to claim 1, wherein if the light-exiting-side lens surface of the plano-concave lens and the highest power surface of the front lens group differ, a sum of power of the light-exiting-side surface and power of the highest power surface is positive.

13. The image pick-up apparatus according to claim 1, further comprising an optical fiber bundle formed of a plurality of optical fibers that guide light coming from the imaging optical system to the image sensor, wherein a light pick-up surface of the optical fiber bundle is a curved imaging surface that receives the light coming from the imaging optical system.

14. The image pick-up apparatus according to claim 1, wherein a light incident surface of the image sensor is a curved imaging surface that receives light coming from the imaging optical system.

15. The image pick-up apparatus according to claim 1, wherein the light-incident-side surface of the plano-concave lens is a substantially flat surface having negligible power.

* * * * *